United States Patent [19]

Norman

[11] Patent Number: 4,969,966

[45] Date of Patent: Nov. 13, 1990

[54] METHOD OF PRODUCING CURVED LAMINATED GLASS PANELS

[75] Inventor: L. C. Norman, Maitland, Fla.

[73] Assignee: Water Bonnet Manufacturing, Inc., Orlando, Fla.

[21] Appl. No.: 371,431

[22] Filed: Jun. 26, 1989

[51] Int. Cl.$^5$ .......................... B32B 31/20; B32B 31/22

[52] U.S. Cl. ....................................... 156/102; 52/789; 52/790; 65/114; 156/107; 156/222; 156/245; 264/261; 428/174; 428/410; 428/442

[58] Field of Search ................... 52/789, 790; 65/104, 65/106, 114; 156/102, 107, 221, 222, 245; 264/261; 428/38, 174, 410, 442

[56] References Cited

U.S. PATENT DOCUMENTS 3,806,400  4/1974  Laethem .......................... 156/102 X
4,234,533  11/1980  Langlands ....................... 156/107 X Primary Examiner—Robert A. Dawson
Attorney, Agent, or Firm—James H. Beusse

[57] ABSTRACT

The method of manufacturing curved laminated glass panels comprises overlaying at least two sheets of flat strengthened glass. Adjacent edges of the at least two sheets are sealed along a predetermined extent thereon to form a closed space between these two sheets. An opening is formed into the closed space along one edge of the glass sheets and glass laminating material is poured into the opening to fill the space between the two sheets. The opening is then closed and the at least two sheets are compressed in a preselected curvature form until the sheets assume the curvature of the form. Finally, the two sheets are held in the preselected curvature until the glass laminating material substantially cures.

4 Claims, 2 Drawing Sheets

METHOD OF PRODUCING CURVED LAMINATED GLASS PANELS

BACKGROUND OF THE INVENTION

The present invention relates to laminated glass panels and, more particularly, to a method of manufacturing curved laminated glass panels from flat sheets of heat strengthened or tempered glass.

Generally, methods for forming curved laminated glass panels such as, for example, glass panels for use as windshields, require that the glass sheets used in forming the panels be curved prior to the lamination process. These processes for forming pre-curved glass sheets are generally expensive. In addition, it is difficult to strengthen or temper preformed glass prior to lamination. For this reason, most curved glass laminating methods use annealed glass for the laminating process. However, curved laminated glass products made of annealed glass are subject to breakage upon small impacts or twisting. Accordingly, systems requiring tempered or strengthened pre-curved glass for laminating require very expensive curve glass tempering or strengthening apparatus.

SUMMARY OF THE INVENTION

It is an object of the present invention to provide a method for forming curved laminated glass panels which overcomes the disadvantages of prior art methods.

It is another object of the present invention to provide a method for forming curved laminated glass panels from tempered or strengthened flat glass sheets.

In a preferred form of the invention, a curved laminated glass panel is formed from flat sheets of tempered or strengthened glass. The method includes the step of placing at least two sheets of flat strengthened glass in an overlaying position with adjacent edges of the glass spaced apart by preselected dimensions. This spacing may be achieved by using double sided tape along the edges of the glass to separate the glass and to hold them together during the forming process. The glass sheets are sealed around the majority of the edges of the sheets to form a closed space between the at least two sheets. An opening is maintained along at least one edge of the sheets through which a laminating material is poured. The laminating material is allowed to flow into the space between the two sheets and to completely fill the space. After the laminating material has filled the space between the two sheets, the final opening is closed and the two sheets are placed in a pre-curved forming apparatus. The forming apparatus includes a pair of mating curved surfaces for compressing the glass panels. The form is closed on the glass panel to force the pair of flat sheets to conform to the shape of the form and the form is maintained in a closed position compressing the panels until the laminating material is substantially cured. After the laminating media is cured, the form is removed and the resultant curved laminated glass panel is lifted from the form.

Applicant has found that this method results in a laminated glass panel which maintains substantially the shape of the form. While the panels have some predetermined amount of spring back towards a flat shape upon removal of compression, this amount of spring back can be compensated by adjusting the shape of the form. Thus, a predetermined degree of curvature of a pair of flat glass sheets can be achieved in a laminated glass product.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1A:
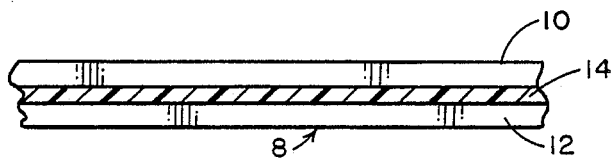
FIG. 1A and 1B represent the construction of a flat laminated glass panel and a curved laminated glass panel, respectively.
Figure 1B:
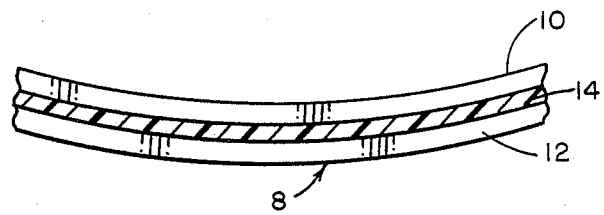
Figure 2:
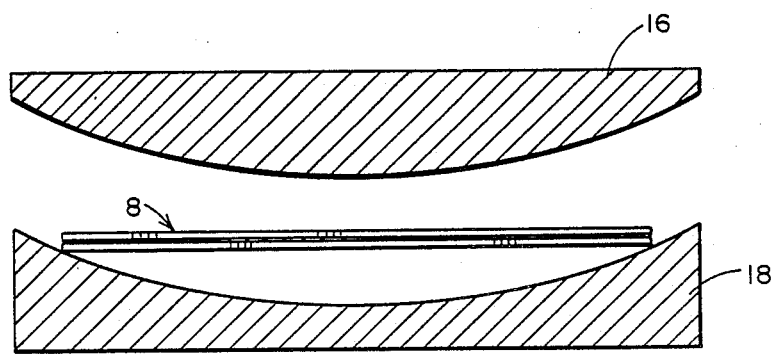
FIG. 2 illustrates the positioning of a flat glass panel into a forming apparatus for forming a curved glass panel.
Figure 3:
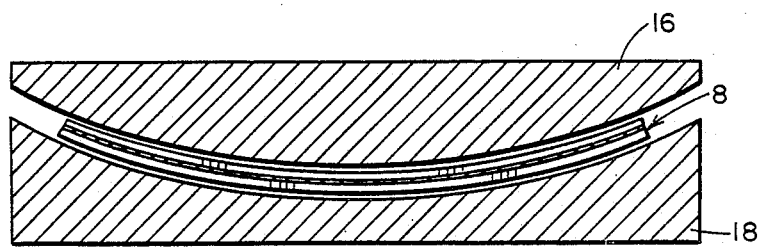
FIG. 3 illustrates the forming apparatus of FIG. 2 with the glass panel compressed between opposed portions of the form.

Referring first to FIG. 1A, there is shown a laminated glass panel 8 comprising a pair of flat glass sheets 10 and 12 spaced apart by a laminating media or lamination resin 14. FIG. 1B illustrates the same type of laminated glass construction but with the upper and lower glass sheets 10 and 12 being curved to a preselected radius to form a curved laminated glass panel. From the drawings in FIGS. 1A and 1B, it will be apparent that the construction of flat laminated glass is the same as the construction of the curved laminated glass except for the shape of the resultant panel. In the illustrative form of the invention, the curved glass panel of FIG. 1B is formed by placing the flat glass panel of FIG. 1A into a forming apparatus substantially as shown in FIG. 2. The forming apparatus includes a male or upper form portion 16 and a female or lower form portion 18. The glass panel 10 is placed in the form and the upper portion 16 is closed on a lower portion 18 to compress the glass panel as illustrated by FIG. 3.

The curved shape of the laminated glass panel is achieved by placing the flat glass panel into the form prior to the laminating media 14 being cured. When the stacked glass structure 8 is compressed between the form portions 16 and 18 and held in that position until the laminating media is substantially cured, it has been found that the resultant laminated product will maintain the curved shape. Typically, the pressure required to compress the tempered or strengthened glass sheets 10 and 12 has been found to be from ten to fifteen pounds per square inch. The assembled glass panel 8 is maintained in the forming apparatus until the laminating media 14 is between 85-90% cured. At that point, the glass panel may be removed from the mold and will maintain substantially the same shape as the form. As mentioned previously, there is a predetermined amount of spring back when the form is released but that amount of spring back is compensated for by having a slightly overcurved set of forms 16 and 18.

Figure 4:
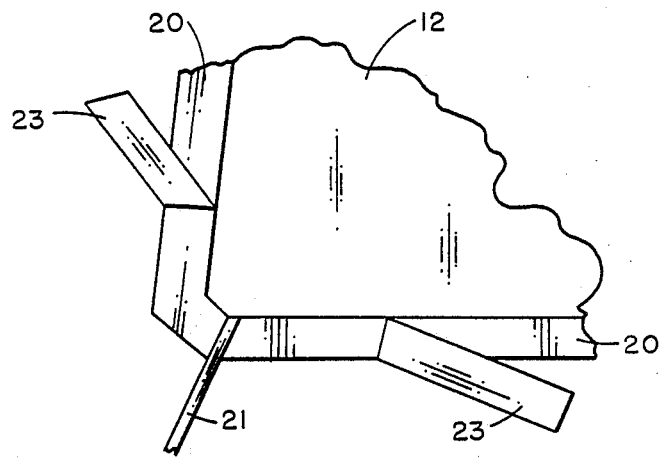
FIG. 4 illustrates a process of providing a spacing material along an edge of a glass panel in practicing the method of the present invention.

The process of forming a curved laminated glass panel as described above generally includes additional detailed steps in preparing the glass and in inserting the laminating media between the spaced sheets of flat glass. For example, the flat glass sheets used for forming the curved glass panel are normally inspected to eliminate those sheets having scratches, cords, stones, spots, or distortion and being of improper size. The glass panels are then washed and cleaned using appropriate cleaners to make sure that all dust and grease or other contaminants are removed from the glass. Commercial glass washer and alcohol may be used in the cleaning process. After cleaning, a spacer tape 20 is placed along the edge of the lower glass sheet 12 as is shown in FIG. 4. The spacer tape is preferably a double-sided tape which allows the upper and lower glass sheets 10 and 12 to be bonded together along their edges. The tape is placed along the edge all around the lower glass sheet 12 but leaving a small air escape vent 21 at corners of the glass sheet. Typically, the air escape vent may be a break in the tape of approximately ⅛ inch wide.

Figure 5:
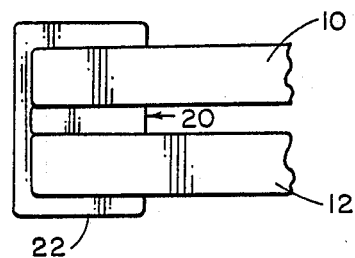
FIG. 5 is a partial cross-sectional view of a pair of glass panels spaced apart and with the edges sealed in preparation for injection of a laminating resin.

After the spacer tape 20 has been placed along the edges of the lower sheet 12, the upper sheet 10 is aligned with and placed on top of the lower sheet. To facilitate the aligning of the edges of the upper and lower glass sheets, the backing paper 23 on the upper side of the double sided spacer tape 20 may be left in place so that the upper glass sheet 10 may be moved with respect to lower glass sheet 12. Once the two glass sheets are aligned, the paper backing 23 on the upper side of the double sided spacer tape may be pulled off without disturbing the positioning of the upper glass sheet 10. The upper glass sheet 10 can then be compressed down onto the lower glass sheet to bond the two sheets together along their edges. A further sealing process can be implemented by using another tape layer overlapping the edges of the upper and lower glass sheets 10 and 12. Referring to FIG. 5, there is shown a partial cross-sectional view of the upper and lower glass sheets 10 and 12, respectively, with the spacer tape 20 between the glass sheets and an outer sealing tape 22 overlapping the edges of the glass sheets. It will be noted that in the disclosed method, at least the spacer tape 20 along at least one adjoining edge of the opposed glass sheets 10 and 12 does not have the paper backing 23 removed so that that edge is not adhesively bonded.

Figure 6:
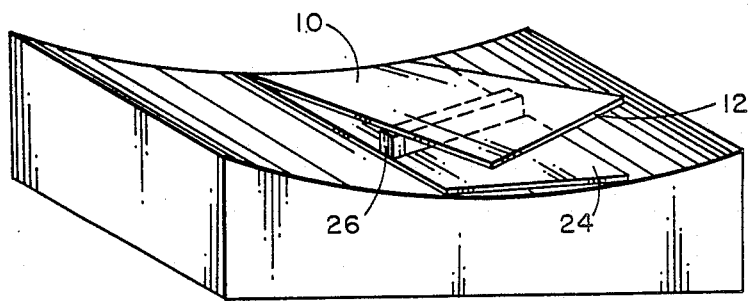
FIG. 6 illustrates one method of positioning a glass panel in preparation for inserting the laminating material.

Referring now to FIG. 6, the pair of glass sheets 10 and 12, joined along at least three edges, are placed in the lower form 18 with a flat supporting board 24 supporting the glass sheets above the form. In addition, a brace 26 is placed beneath one end of the glass sheets to raise that end of the glass sheets above the opposite end. As will become apparent, the laminating material is poured into the spacing between the panels using gravity for flow control and the angle of the glass sheets is required to distribute the laminating media. Typically, the front end of the glass sheet is raised about four inches higher than the back end of the glass sheets.

Figure 7:
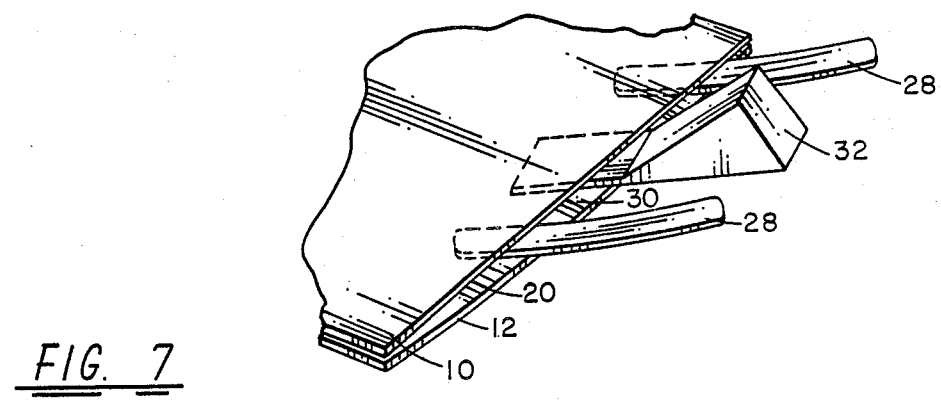
FIG. 7 illustrates one method of inserting laminating material between at least two flat glass sheets.

Referring to FIG. 7, the front end of the glass sheets, along the unsealed edge, are pried apart using small plastic pry bars 28 to form a spacing or gap 30 of about ¼ inch between the upper glass sheet 10 and the surface of the spacer tape 20. A pouring funnel 32 is inserted into the gap to allow the laminating material to be poured into the space between the two sheets. The laminating material may be any of a known type of glass laminating materials such as, for example, polyester resin mixed with curing catalysts. The mixed laminating material is poured into the spacing between the upper and lower glass sheets 10 and 12 through the funnel 32. When the laminating material gets to the opposite corners of the two glass sheets where the preformed vents 21 have been left, the vents are blocked with a glazing compound and secured by tape. The pouring funnel 32 is removed and the spacer tape's paper backing 23 at the open end is pealed away to allow the last edge of the upper and lower glass sheets to be bonded together. A masking tape is then placed over this last edge to complete the sealing process. The brace 26 is then removed from under the laminated glass sheets and the sheets are allowed to lie flat on the board 24 in the form 18. Pressure is then applied to the top of the assembled glass panel 8 to spread the laminating media 14 throughout the space between the upper and lower glass sheets 10 and 12. Pressure may be applied by positioning a second flat board (not shown) on top of the upper glass sheet and placing a preselected weight on top of the board. The laminating mixture can then spread throughout the space between the glass sheets. When the laminating mixture begins dripping through the vent holes 21, the holes can be plugged with glazing compound and secured with masking tape. Any air bubbles in the laminating material can be removed by use of a syringe and needle.

After the laminating material has been throughly spread throughout the space between the upper and lower glass sheets 10 and 12, the flat boards can be removed from above and below the glass sheets and the glass sheets placed in the desired position within the form portion 18. The form portion 16 is then brought down into postion over the glass sheet and allowed to compress the glass between the upper and lower form portions 16 and 18. After a suitable curing time, the form can be released and the curved laminated glass removed from the form.

It will be noted that various types of glass laminating materials may be utilized to bond the upper and lower glass sheets together. If desired, an ultraviolet light cured laminating material can be used by covering one or both of the upper and lower form portions 16 and 18 with a light transmissive material such as a clear acrylic material so that ultraviolet light can be transmitted to the laminating media. Furthermore, the forming apparatus can be constructed with heating equipment to provide heat to the glass assembly if the laminating media requires additional heat for curing.

What has been described is a method for forming a curved laminated glass panel which allows the curved laminated glass panel to be formed in situ and without preformed or pre-curved glass. While the invention has been described in what is presently considered to be a preferred embodiment, other variations, modifications, and arrangements will become apparent to those having ordinary skill in the art. For example, it has been found that the curved, laminated glass panels can be removed from the form prior to curing of the laminating material and the curved shaped held until curing by a wire or cord stringer extending from edge-to-edge of the panel, similar to a bow string. It is intended, therefore, that the invention not be limited to the disclosed embodiment but to be interpreted within the full spirit and scope of the appended claims.

What is claimed is:

1. A method of producing a curved, laminated glass panel from at least two planar sheets of tempered glass comprising the steps of:
   overlaying the at least two sheets of flat tempered glass;
   sealing adjacent edges of the at least two sheets along a predetermined extent thereof to form a closed space between the sheets;
   forming an opening into the closed space along one edge of the glass sheets;
   pouring a glass laminating material into the opening to fill the space between the at least two sheets;
   closing the opening;
   compressing the at least two sheets in a form having a preselected curvature until the sheets assume the curvature of the form; and
   holding the at least two sheets in the preselected curvature until the glass laminating material is substantially cured, and thereafter removing the curved glass panel from the form.

2. The method of claim 1, and including the step of positioning spacers between the at least two sheets along the edges thereof for establishing a preselected spacing therebetween.

3. The method of claim 1, wherein the step of holding includes holding the at least two sheets in the form under compression.

4. The method of claim 1, wherein the step of holding includes the steps of removing at least two sheets from the form and connecting a stringer from edge-to-edge of the sheets to hold the curved shaped until the glass laminating material is substantially cured.

* * * * *